Patented Mar. 19, 1935

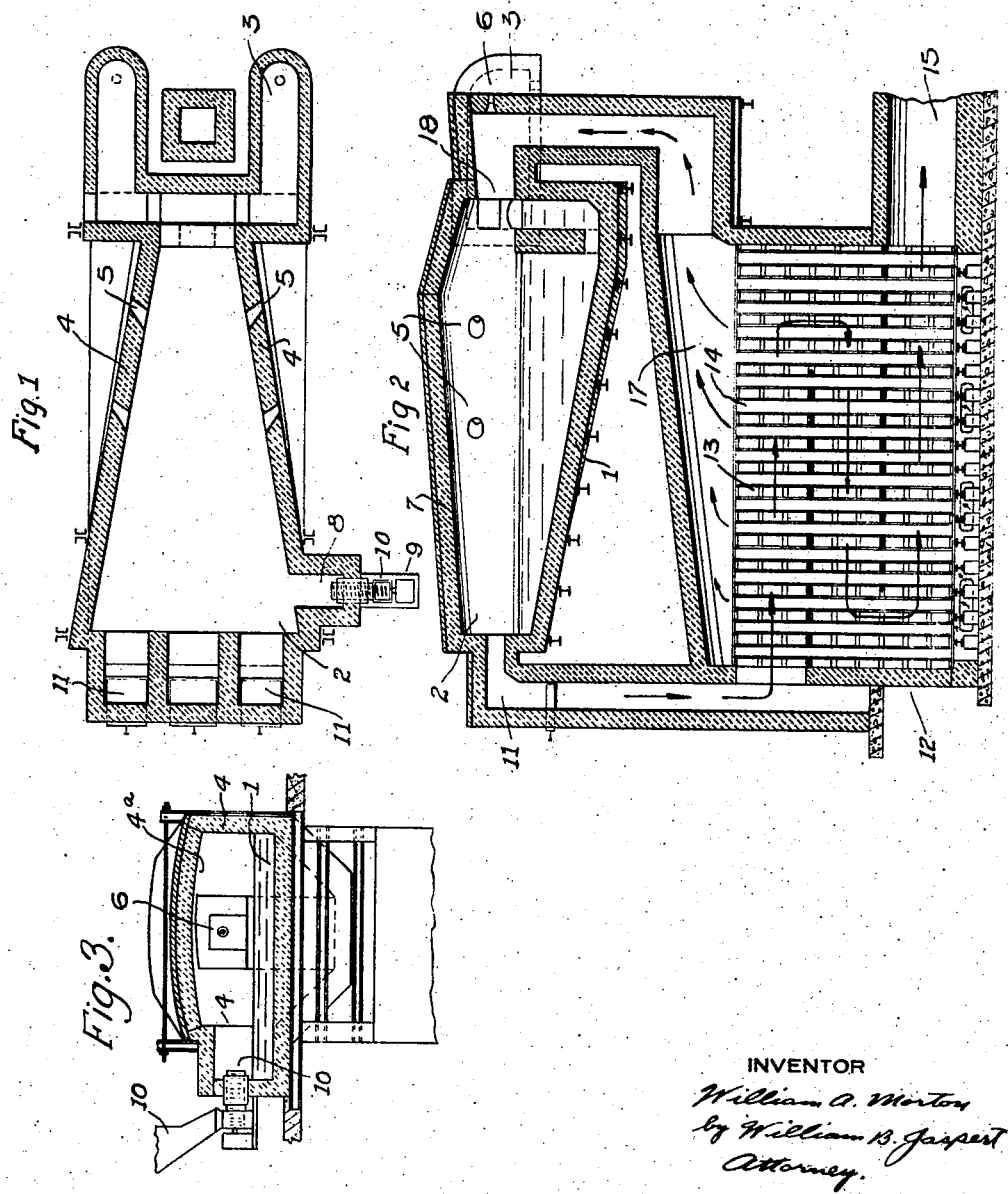

1,994,959

UNITED STATES PATENT OFFICE 1,994,959

APPARATUS AND METHOD FOR MAKING GLASS

William A. Morton, Pittsburgh, Pa., assignor to Amco, Incorporated, Pittsburgh, Pa., a corporation of Pennsylvania Application February 13, 1929, Serial No. 339,574

9 Claims. (Cl. 49—54)

This invention relates to continuous glass melting tanks or furnaces of the type in which the batch material is charged at one end of the tank and the molten metal is withdrawn or fed from the other end of the tank.

The conventional glass melting tank is usually rectangular in shape and of uniform depth. The depth and width is of such extent as to promote convectional movement of the glass which is beyond the control of the operator. The fire used for melting is generally applied from the sides across the area of flow in such manner as to create convection which would submerge surface glass into the lower and more viscous materials, due to the movement set up by the heat or temperature differentials under localized flame streams. Certain types of furnaces have the heat or fire applied from the end and in the general direction of the glass movement in the direction of discharge.

The velocity of the surface glass may be reduced to such an extent that the air turbulence caused by the entering flame and heated gases, impinging on the surface glass will impart a definite motion in excess of the flow rate created by discharging glass or displacement in the fluid body. This increase in the rate of surface flow of glass in excess of the flow of the submerged portions of the glass towards the discharge orifice is a serious factor, preventing the production of a sufficient quantity of good quality glass considering the area involved in the operation and the fuel consumed.

Furthermore, the unmelted portions of the glass are lighter in weight than the melted portions on which they are floated. In the usual form of glass melting furnace, any reduction of viscosity of the supporting glass will act as a ready means to promote the movement of unmelted portions in a flame stream moving in the same general direction as the glass stream. By downward acting convection currents will move more rapidly than the lower portions of the glass.

It is among the objects of the invention to provide a glass melting furnace or tank which is adapted to obtain increased melting rates and which shall produce a uniform quality of glass.

The invention has for its principal object the promotion of ebullition currents for mixing the raw materials in a state of flux in the zone adjacent the charging end of the process, and the method of limiting convection currents in the refining zone more remote from the charging end.

A further object of the invention is to provide a furnace of such shape as to prevent deep acting currents in the zone of ebullition where the flames are active in the newly charged raw materials.

Another object of this invention is to retard the flow of the surface of glass in the furnace by a counterflow heating gas in the direction of the approaching glass.

A further object is to provide a furnace structure and heating means therefor which shall function to equalize the temperature of the entire glass body, and A still further object of the invention is to provide a tank structure in which the metal will be accumulated in sufficient volume to be thoroughly at rest.

To prevent deep acting currents in the zone of ebullition where the flames are active in the newly charged raw materials, this portion of the furnace should have increased surface exposed to the heat and less depth of metal to promote rapid melting of the glass. Such a shallow hearth or glass pool will have more uniform temperatures than a deep pool, thereby preventing deep submergence of any unmelted batch materials before they have adequate exposure to melting heat. The hearth bottom is gradually sloped in the direction of glass flow to provide space for the accumulation of the portions of the batch which are fully melted and naturally settle to the bottom due to the change in specific gravity as the melting process progresses.

The retardation of the flow of the surface of glass is accomplished by reducing the width of the furnace gradually and simultaneously increasing the depth, and by introducing the heating gas flow in a direction opposed to the gas flow direction. Surface tension created by the contact of the glass with the cooler refractory materials forming the side of the hearth or glass support is an aid in securing further retardation of the glass flow. The gradual deepening and narrowing of the furnace hearth tends to limit the tendency to thermal convection in the glass body approaching the discharge portion of the tank; however, the temperature is equalized by the mechanical mixing of the glass by the gradual change of form without a progressive change of volume.

In a furnace having a shallow ebullition pool the elements to be melted will be reduced quicker because they will be exposed more frequently to the action of flame than in a deep pool where the rate of convectional movement will submerge the elements to be melted for longer periods of time.

In glass melting furnaces of this type, all the glass will move at a more uniform temperature rather than as a stream through the center or along the sides, will not have any "dead" or motionless pockets due to the shape which tends to retard the movement of glass except by displacement of glass by discharge from the furnace. Portions of the furnace may be insulated to increase the wall thickness for economy or heat control at any point.

These characteristics of the furnace and the heating means will become more apparent from a consideration of the accompanying drawing constituting a part hereof, and in which like reference characters designate like parts, and in which Figure 1 is a longitudinal sectional view taken along the line I—I, Fig. 2 of a glass melting furnace embodying the principles of this invention; Fig. 2 is a vertical sectional view thereof, illustrating its connection with a recuperator; and Fig. 3 is a front sectional elevational view.

The furnace body proper is a tetrahedron having a relatively flat arch rising slightly toward the center of furnace to increase combustion space at point of maximum flame propagation. 1 designates the hearth sloping gradually from the charging end 2 to the discharge end 3 of the furnace. The side walls 4 are gradually contracted from a wide section at 2 to a narrow cross-section adjacent the end 3. The roof 4a is slightly arched rising toward the center of the furnace. The walls 4 are provided with burner ports 5 disposed in the opposite direction to the glass flow, and a burner port 6 is located at the discharge end of the furnace. The roof 7 of the furnace is slightly arched as shown in Fig. 3 and is tapered as shown in Fig. 2.

The materials are charged into the tank at 8 at which the side wall is projected to form a receiving passage into which the material is fed by a hopper and screw 9 and 10 respectively.

Waste gases pass to the charging end 2 of the tank and the passages 11 to a recuperator 12 which is constructed of alternate rows of flange tile 13 and flue tile 14. The hot waste gases pass through the flange tile as indicated by arrows and then to a stack passage 15. Air passages 16 are provided underneath the flue tile and preheated air passes from the dome 17 of the recuperator to the air inlet 18 of the furnace which is above the level of the glass.

The heating means is located in the portion of the furnace adjacent the glass discharge end and serves to equalize the temperature of the entire glass body in the furnace by liberating the energy in the zone of greatest glass depth where the body will be maintained uniformly heated by conduction and the mechanical distribution of metal due to decreased width of furnace. The waste heat will flow at a high rate of speed toward the raw materials charging end and will gradually spread out over the entire hearth surface due to the aspirating action of the flame cone and the distribution of the waste heat outlets across the entire rear end of the hearth. The hearth 1 and side walls 4 are of heavier section in the deep and narrow portion of the tank as shown in Figs. 1 and 2 for economy of heat and temperature control.

Preheated air enters the furnace combustion laboratory above the glass near the discharge end and passes over the glass in the opposite direction to glass flow on the longitudinal axis. Fuel may be applied at the discharge end or from either side of the furnace to mix with the combustion air flowing along the central axis of the furnace.

By the use of a tank as herein described, glass is refined most rapidly at the portion of the tank remote from the charging end at which the viscosity of the glass mass is such that included gases of formation may rise to the pool surface by specific gravity and retain sufficient internal pressure to burst the glass wall retaining the gas; the hydrostatic pressure which causes the bubble to rise in the glass mass must be sufficient to overcome the action of internal currents such as convection in the metal. On account of the sloping hearth, the metal is accumulated in sufficient volume to overcome cooling which would tend to start internal movement; it should be thermally at rest due to general equalization of temperature in the mass. It is therefore advisable to insulate the zone in which it is desirable to refine glass and also provide means for temperature equalization in the mass prior to its entry into a refining zone.

I claim herein as my invention:

1. In a continuous glass melting and refining furnace, a hearth and side walls for supporting a pool of glass shaped to maintain a substantially uniform cross-sectional area while greatly varying the width and depth, the width continuously decreasing in the direction of the discharge end of the tank and the depth continuously increasing in the same direction, means for introducing the glass making ingredients in the zone of greatest area and least depth on the surface of said pool, and means for introducing the heating medium in the zone opposite said charging zone of the pool to progressively increase the temperature of the glass flowing to the discharge end of the tank.

2. The method of melting and thermally equalizing the refined molten glass which comprises melting the glass in the pool with the materials charged into an extended shallow portion of the pool, and flowing the glass as it refines in a pool of progressively diminishing area to submerge the surface glass causing it to mechanically mix by the forces of displacement acting upon it.

3. The method of melting and refining glass in the pool which comprises charging the raw ingredients in a shallow extended area of the pool and refining the glass by flowing it toward a source of heat while submerging the heated surface glass by progressively decreasing the area of the heated surface glass to mix the glass into a mass of thermal equilibrium of low viscosity to readily release the included formative gases of the flux ingredients.

4. The method of refining and melting glass in a pool which comprises melting the raw ingredients in a shallow extended area and refining the glass in a contracted deeper area after mechanically mixing the metal by causing it to flow through a hearth of progressively changing shape as the viscosity of the molten glass is reduced and toward a source of heat for the pool.

5. The method of melting and refining glass in a furnace hearth which comprises charging the raw materials into the hearth at the point of greatest width and least depth and removing the glass at the point of greatest depth and least width, and applying a stream of heated gases to the hearth against the flow of the melting materials, and withdrawing the molten glass from the zone of greatest depth through a submerged outlet leading to a working chamber.

6. The method of melting and refining glass in a furnace hearth which comprises charging the raw materials into the hearth at the point of greatest width and least depth and removing the glass from the point of greatest depth and least width, withdrawing the molten glass from the zone of greatest depth through a submerged outlet to a working chamber while applying heat at spaced intervals along the hearth against the flow of the glass for the melting of the glass.

7. In glass apparatus, a furnace including a melting end having an inclined bottom and side walls converging from the intake end of said furnace.

8. In glass apparatus, a furnace including a melting tank increasing vertically in cross section and decreasing in surface width from the intake end to the outlet end thereof.

9. In a continuous glass melting and refining furnace, a hearth and side walls for supporting a pool of glass, the depth of the hearth continuously increasing in the direction of the refining portion, a bridge-wall extending across the furnace at the portion of greatest depth of the hearth having a restricted glass flow passage adjacent the hearth, said bridge-wall dividing the furnace into a melting and a refining compartment, the latter being relatively small in proportion to the melting compartment to provide a maximum flow of glass through said bridge-wall passage, means for introducing the glass making ingredients adjacent the shallow end of the hearth and means for introducing the heating medium at the opposite end of the furnace.

WILLIAM A. MORTON.